Patented Jan. 8, 1952

2,581,987

UNITED STATES PATENT OFFICE 2,581,987

PROCESS FOR DECREASING THE DEGREE OF POLYMERIZATION OF POLYVINYL ALCOHOL

Karl Vogler, Basel, Switzerland, assignor to Hoffmann-La Roche Inc., Nutley, N. J., a corporation of New Jersey No Drawing. Application January 12, 1950, Serial No. 138,255. In Switzerland November 18, 1948

4 Claims. (Cl. 260—91.3)

The present invention concerns a process for decreasing the degree of polymerization of polyvinyl alcohol and, more particularly, the preparation of polyvinyl alcohols of low degree of polymerization, said polyvinyl alcohols having an average molecular weight between about 500 and about 15,000, preferably between about 500 and about 10,000. (The molecular weight may be determined, for example, according to the procedure of Staudinger and Warth, "Journal für praktische Chemie," vol. 155, 1940 p. 261.)

The preparation of polyvinyl alcohols of low molecular weight presents a special problem, because it is difficult, if not impossible, to carry out the known technical processes for the manufacture of vinyl alcohol polymerizates, by polymerization of vinyl acetate and subsequent saponification, in such a manner that polymerizates of an average molecular weight lower than about 10,000 are formed. By the said technical processes polymerizates of from medium to high degree of polymerization are formed. By polymerizates of medium degree of polymerization are understood products having an average molecular weight between about 15,000 and about 30,000; and by polymerizates of high degree of polymerization are understood products having an average molecular weight of at least about 30,000. From the Gauss distribution curve, it appears that only a minor proportion of low molecular weight polyvinyl alcohols is formed in the polymerizates obtained by the known processes and, consequently, mere fractionation of such polymerizates yields only very small quantities of the desired vinyl alcohol polymerizates of low degree of polymerization.

The present invention provides a process for decreasing the degree of polymerization of polyvinyl alcohols, which process comprises heating, in a pressure vessel, an aqueous solution of polyvinyl alcohol to a temperature between about 170° C. and about 250° C.

More particularly it has been found, that vinyl alcohol polymerizates of low degree of polymerization may be obtained by heating an aqueous solution of a polyvinyl alcohol of from medium to high degree of polymerization to a temperature between about 170° C. and about 250° C., in a pressure vessel.

It is advantageous to exclude air during the degradation process. A temperature between about 180° C. and about 250° C. is preferred. The starting materials may be vinyl alcohol polymerizates as obtainable by known processes. The concentration may be varied as desired, but the very low concentrations impose a burden because of the large volumes of solutions to be handled, whereas the very high concentrations are also not desirable because of the higher viscosity of the more concentrated solutions. For technical purposes, the concentration should therefore not exceed about 20 per cent., though for experimental purposes the process may be worked also when higher concentrations are employed. Preferred are concentrations between about 4 per cent. and about 15 per cent. The specific temperature and length of heating which are appropriate to carry out the reaction in any given case may easily be determined; they depend, on the one hand, on the starting material employed, and, on the other hand, on the desired degree of degradation. The course of the degradation reaction may be followed by determining from time to time the viscosity of samples taken from the presure vessel, and the reaction should be interrupted as soon as the material is found to have the desired properties.

The desired vinyl alcohol polymerizates may be isolated by methods known per se. For example, the solution obtained by the degradation reaction may be worked up by first concentrating said solution to a small volume under reduced pressure, and then dropping into the highly viscous solution thus obtained, while stirring, a suitable water-miscible organic liquid precipitant, such as acetone, methanol, ethanol or dioxane. By this treatment, the product is precipitated in the form of threads which may easily be dried in vacuum after the organic precipitant has been pressed off. By fractionating, in a manner known per se, the product thus formed, vinyl alcohol polymerizates are obtained wherein the molecular weights of the individual components show relatively little scattering as evidenced by the Gauss distribution curve.

The products obtained in accordance with the present invention are useful as intermediates in the manufacture of bases for ointments and plasters, as emulsifying agents and as vehicles for therapeutic agents.

EXAMPLE 1

*Degradation of a 4.2 per cent solution*

50 g. of a polyvinyl alcohol having an average molecular weight of about 29,000

$$\left(\lim_{c \to 0}\left[\frac{\text{eta spec.}}{c}\right]=0.0483\right)$$

determination of the molecular weight according to Staudinger and Warth (loc. cit.) are stirred, on a water bath, with a little water to form a dough; then more water is added until a volume of about 1,200 cc. is obtained, and after warming for about two hours a clear solution is obtained. The solution is cooled to room temperature and is then set to a volume of 1,300 cc. by the addition of more water. Thereupon it is heated in a shaking autoclave to about 120° C.; at this temperature, about 100 cc. of water are distilled off through a pressure tube in order to remove air from the pressure vessel. The volume of the solution in the pressure vessel at this point is about 1,200 cc. and the concentration is, therefore, approximately 4.2 per cent. In the course of about one hour, the solution is then heated to 230° C. and maintained at this temperature (±3° C.) for 1½ hours. The solution is cooled down to room temperature in the course of about three hours, the reaction mixture is removed from the autoclave and filtered. The filtrate is concentrated under reduced pressure (about 20 mm. Hg) to a volume of about 200 cc. Thereupon, the highly viscous solution obtained is dropped, while stirring, into about four to five times its volume of acetone. Fibers of the polyvinyl alcohol are thus precipitated and wind themselves around the stirrer. From time to time the dropping-in is interrupted, the precipitate is collected, placed in a vessel and covered with a layer of fresh acetone. After standing for a short time the acetone is poured off from the fibrous polyvinyl alcohol. The fibers are squeezed to remove additional acetone and the polymerizate is dried in vacuum at 70° C. Yield: 36 g. The product is almost colorless. From determinations of its viscosity, the average molecular weight of the product may be calculated according to the method of Staudinger and Warth (loc. cit.) to be 15,200.

When the process is repeated with the only difference that the degradation period is increased, the end products of each single experiment show a decreasing average molecular weight, and, for a long degradation period, the yield drops rather substantially, as shown in the following table:

| Test No. | Amount of starting material G | Degradation period in hours | $\lim_{c \to 0} \left[ \frac{\text{eta spec}}{c} \right]$ | Average molecular weight | Yield in grams |
|---|---|---|---|---|---|
| 1 | 50 | 1.5 | 0.0315 | 15,200 | 36 |
| 2 | 50 | 3.0 | 0.0270 | 12,000 | 37 |
| 3 | 50 | 4.5 | 0.0220 | 9,250 | 36.8 |
| 4 | 50 | 7.0 | 0.0205 | 8,100 | 32.5 |
| 5 | 50 | 9.0 | 0.0166 | 6,000 | 36 |
| 6 | 50 | 24.0 | 0.0040 | 750 | 15 |

The following illustrates the fractionation procedure: 30 g. of a polyvinyl alcohol having an average molecular weight of about 9,000, obtainable as described above, are dissolved on a steam bath in 500 cc. of water. After filtration, the solution is allowed to cool down to room temperature. At this temperature, 200 cc. of acetone are added quickly, while stirring, and then an additional 160 cc. of acetone are added drop by drop, whereupon the solution turns turbid. Upon the addition of another 40 cc. of acetone, a first fraction of the polymerizate is gradually precipitated and accumulates on the bottom of the vessel. After standing for 10 minutes at room temperature, the solution is poured off from the precipitate and the latter is freed from the remaining mother liquor by centrifuging. It is then taken up in about 200 cc. of water, the solution is filtered, and the filtrate is concentrated under reduced pressure (about 20 mm. Hg) to a volume of about 30 cc. The polymerizate is precipitated therefrom with acetone in the same manner as described above and the precipitate is dried under reduced pressure at 70° C.

For the precipitation of a second fraction from the mother liquid, 30 cc. of acetone are used, for a third fraction 45 cc., and for a fourth fraction 90 cc. of acetone are required. From the now remaining mother liquor a fifth fraction is isolated by evaporating the solvent, taking up the residue in water and precipitating the polymerizate with acetone.

The characteristics of the fractions so obtained are shown in the following table:

| Fraction | Yield in per cent | Yield in grams | Average molecular weight |
|---|---|---|---|
| I | 13.65 | 4.1 | 16,700 |
| II | 14.00 | 4.2 | 12,400 |
| III | 15.33 | 4.6 | 11,500 |
| IV | 15.67 | 4.7 | 9,700 |
| V | 37.65 | 11.3 | 4,000 |
| Sum | 96.30 | 28.9 | |

EXAMPLE 2

*Degradation of a 10 per cent solution*

1200 cc. of a 10 per cent aqueous solution of a polyvinyl alcohol having an average molecular weight of about 40,000

$$\left( \lim_{c \to 0} \left[ \frac{\text{eta spec.}}{c} \right] = 0.0600 \right)$$

are placed in a shaking autoclave, which is then blown with nitrogen under high pressure three times to remove air. The contents of the autoclave are heated to 230° C. while shaking. After ½ hour a 100 cc. sample of the solution is removed from the autoclave. This sample is dropped into stirred acetone. The precipitate is separated from the supernatant solution and dried. The molecular weight of the dried product is determined viscosimetrically according to Staudinger and Warth. Further samples are removed after 1 hour, 1½ hours and 2 hours, and the degradation is interrupted after 3 hours. The residue remaining in the autoclave at the interruption of the operation constitutes the main part. The samples and the residue are worked up separately as described above. The degradation period, the viscosity, the average molecular weight, and the yield of each fraction are shown in the following table:

| Degradation period in hours | $\lim_{c \to 0} \left[ \frac{\text{eta spec.}}{c} \right]$ | Average molecular weight | Yield in grams |
|---|---|---|---|
| 0.0 | 0.0600 | 40,000 | |
| 0.5 | 0.0450 | 26,500 | 8.4 |
| 1.0 | 0.0340 | 16,500 | 10.9 |
| 1.5 | 0.0295 | 14,000 | 11.0 |
| 2.0 | 0.0225 | 9,400 | 7.0 |
| 3.0 | 0.0220 | 9,000 | 56.0 |
| | | | 93.3 = 78 per cent |

EXAMPLE 3

*Degradation of a 0.5 per cent solution*

6 g. of a polyvinyl alcohol having an average molecular weight of about 30,000

$$\left(\lim_{c \to 0}\left[\frac{\text{eta spec.}}{c}\right]=0.0495\right)$$

are dissolved in water and the solution is diluted to a volume of 1200 cc. The concentration is thus 0.5 per cent. After removing air, the solution is heated in a shaking autoclave, as described in the preceding example. After ½ hour and 1 hour, 200 cc. samples of the degradation solution are taken off and after 2.8 hours the procedure is interrupted. The samples and the residues are concentrated separately under reduced pressure and worked up as described in the preceding example. The data for the fractions are shown in the following table:

| Degradation period in hours | $\lim_{c \to 0}\left[\dfrac{\text{eta spec.}}{c}\right]$ | Average molecular weight | Yield in grams |
|---|---|---|---|
| 0.0 | 0.0495 | 30,000 | |
| 0.5 | 0.0350 | 18,000 | 0.95 |
| 1.0 | 0.0340 | 17,500 | 0.92 |
| 2.8 | 0.0325 | 16,300 | 3.0 |
| | | | 4.87 = 82 per cent |

If, instead of interrupting the operation after 2.8 hours, the procedure is continued for a longer period of time, the degree of polymerization and, accordingly, the average molecular weight will further decrease to low values.

This application is a continuation-in-part of my copending application Ser. No. 64,428, filed December 9, 1948, now abandoned.

I claim:

1. A process which comprises heating to a temperature between about 180° C. and about 250° C., in a closed vessel and in the absence of air, an aqueous solution of polyvinyl alcohol having an average molecular weight greater than about 15,000, said solution containing said polyvinyl alcohol in a concentration between about 4 per cent and about 15 per cent, so as to produce polyvinyl alcohol having an average molecular weight between about 500 and about 10,000.

2. A process for decreasing the degree of polymerization of polyvinyl alcohol which comprises heating to a temperature between about 170° C. and about 250° C., in a closed vessel, an aqueous solution of polyvinyl alcohol containing the polyvinyl alcohol in a concentration between about 0.5 per cent and about 20 per cent.

3. A process for decreasing the degree of polymerization of polyvinyl alcohol which comprises heating to a temperature between about 170° C. and about 250° C., in a closed vessel, an aqueous solution of polyvinyl alcohol containing the polyvinyl alcohol in a concentration between about 4 per cent and about 15 per cent.

4. A process which comprises heating to a temperature between about 170° C. and about 250° C., in a closed vessel and in the absence of air, an aqueous solution of polyvinyl alcohol having an average molecular weight greater than about 15,000, said solution containing said polyvinyl alcohol in a concentration between about 0.5 per cent and about 20 per cent, so as to produce polyvinyl alcohol having an average molecular weight between about 500 and about 15,000.

KARL VOGLER.

REFERENCES CITED

The following references are of record in the file of this patent:

Hermann et al.: Berichte 60, page 1661 (1927).